Oct. 13, 1931.  A. E. CLARK  1,826,925
MACHINE FOR MAKING DIAPERS
Filed Feb. 26, 1929    7 Sheets-Sheet 1
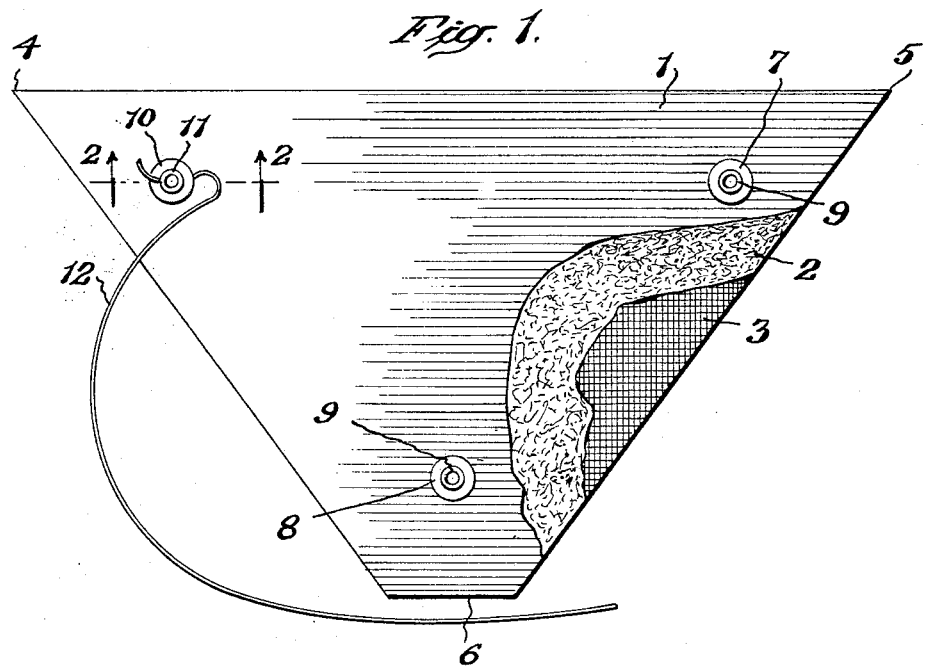
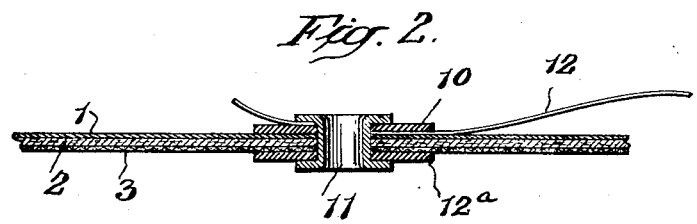
INVENTOR
Arthur E. Clark
BY Harry Radzinsky
his ATTORNEY

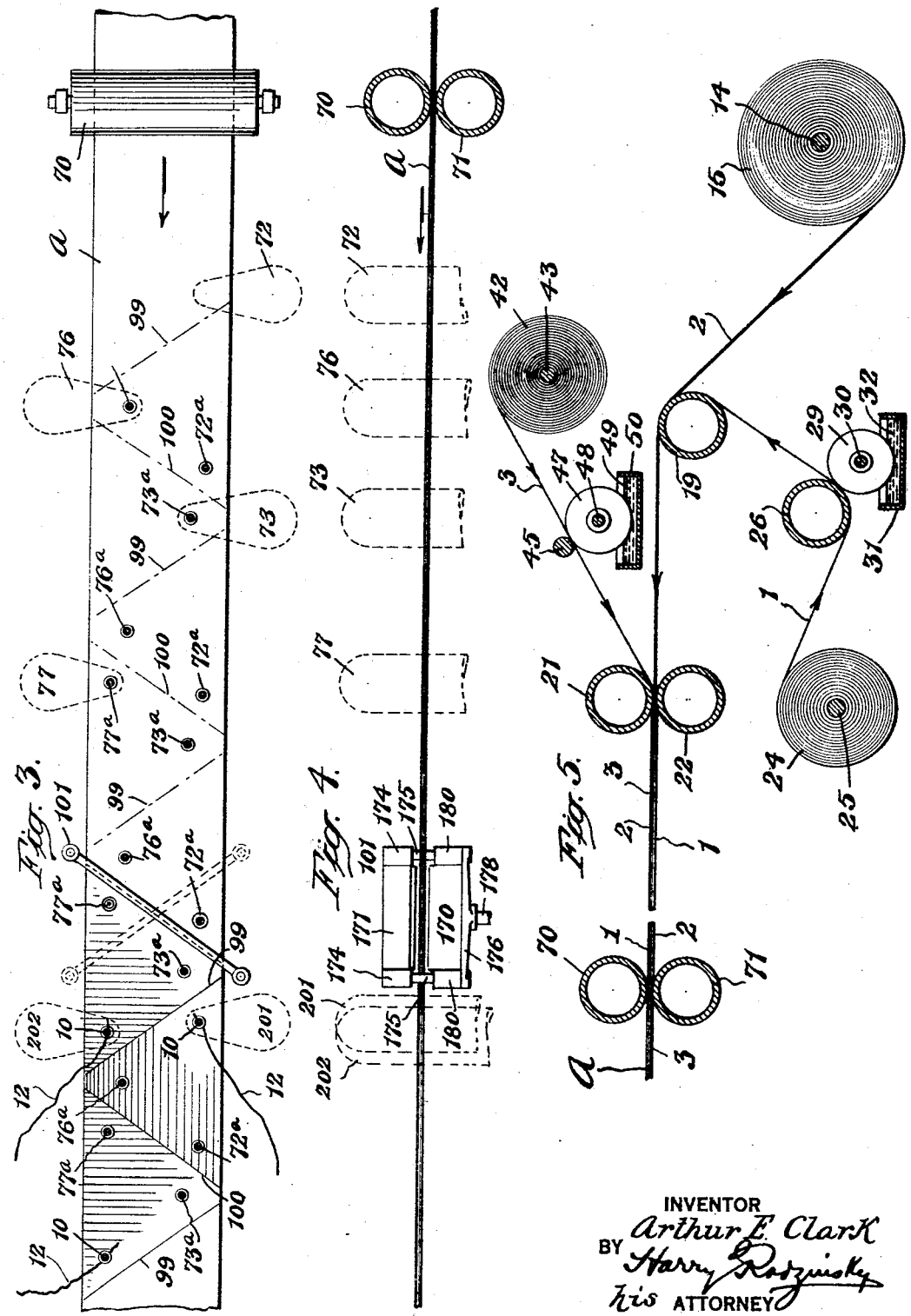

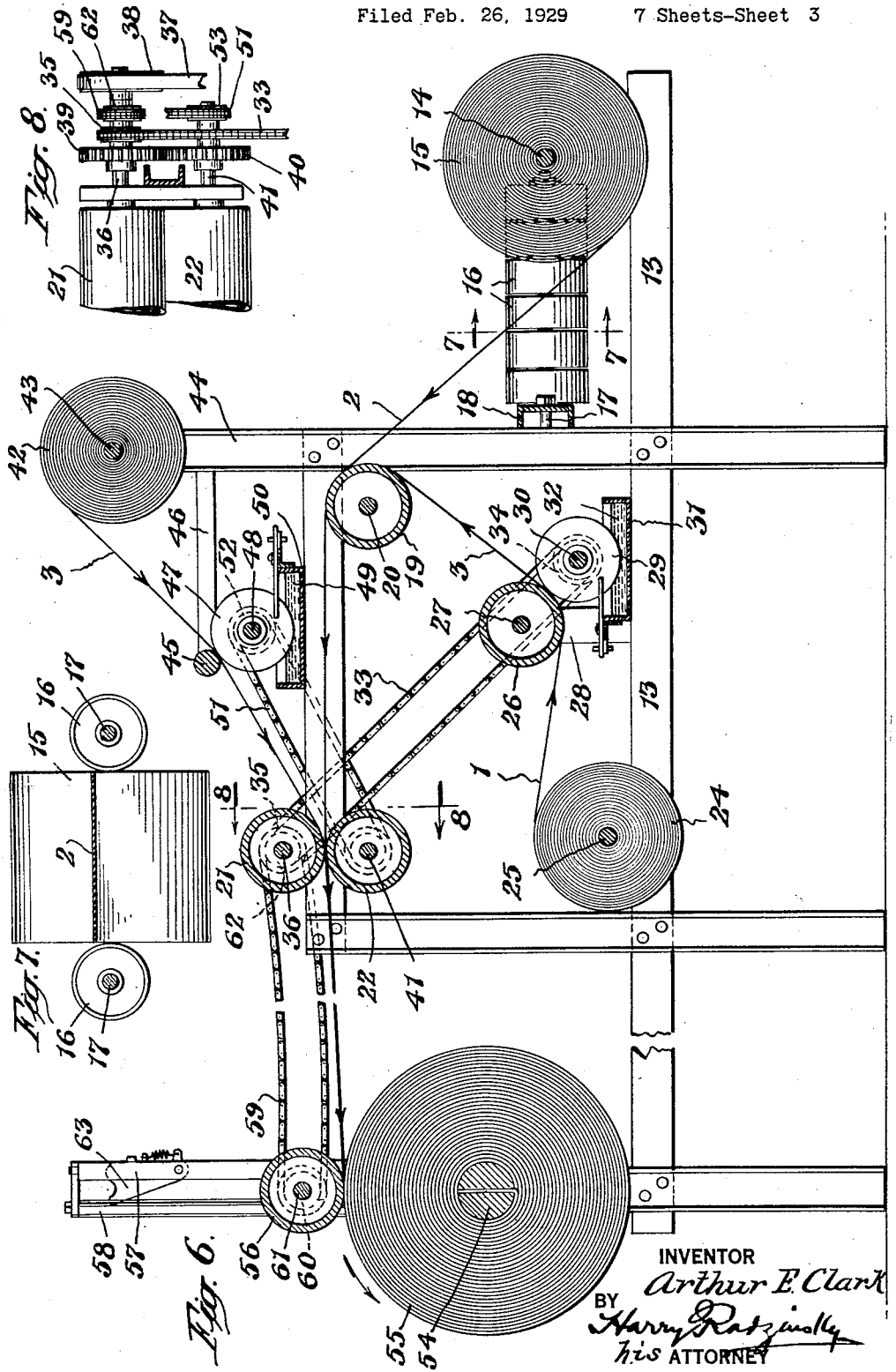

Oct. 13, 1931.  A. E. CLARK  1,826,925
MACHINE FOR MAKING DIAPERS
Filed Feb. 26, 1929    7 Sheets-Sheet 4
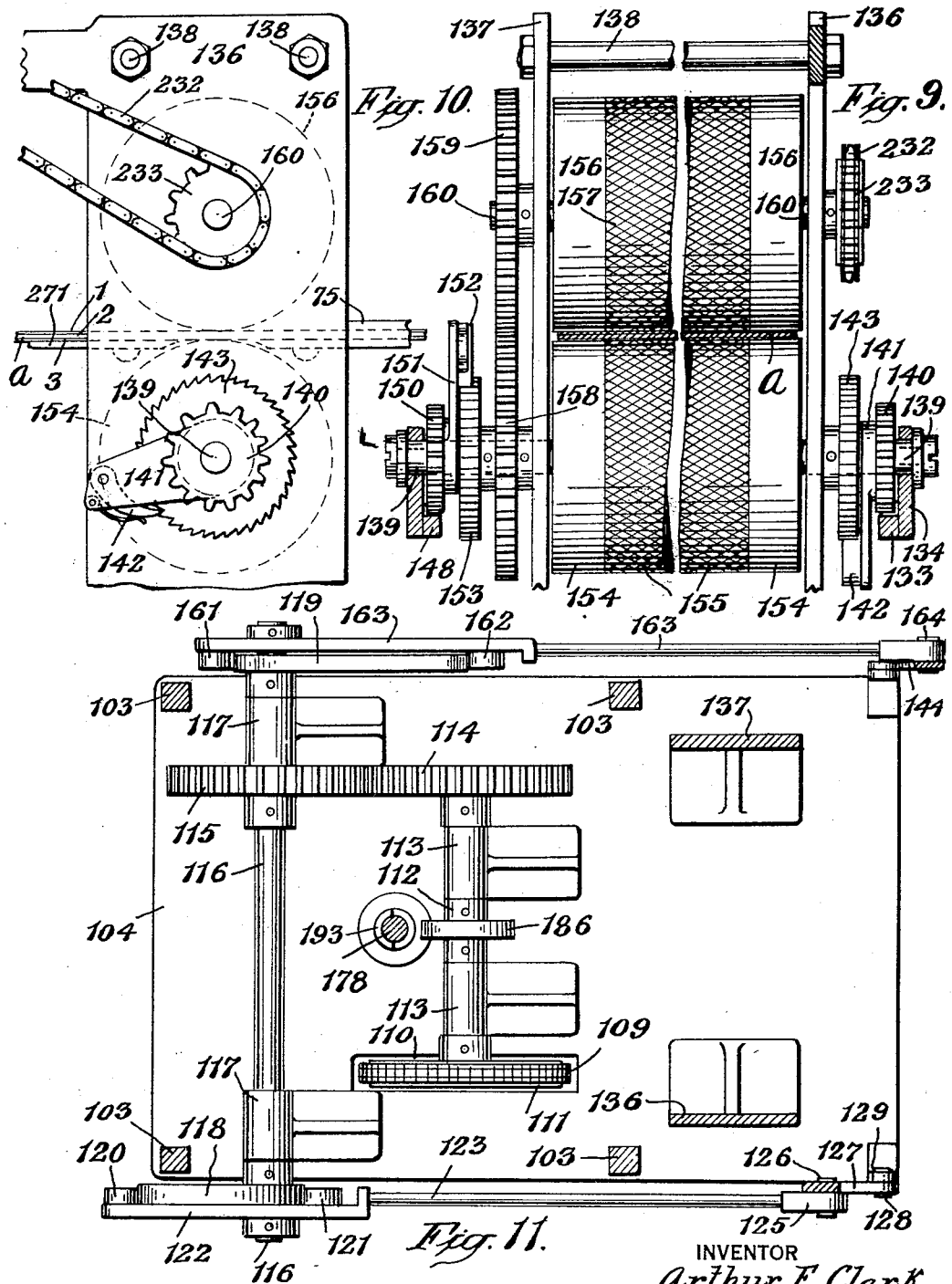
INVENTOR
Arthur E. Clark
BY Harry Rodzinsky
his ATTORNEY

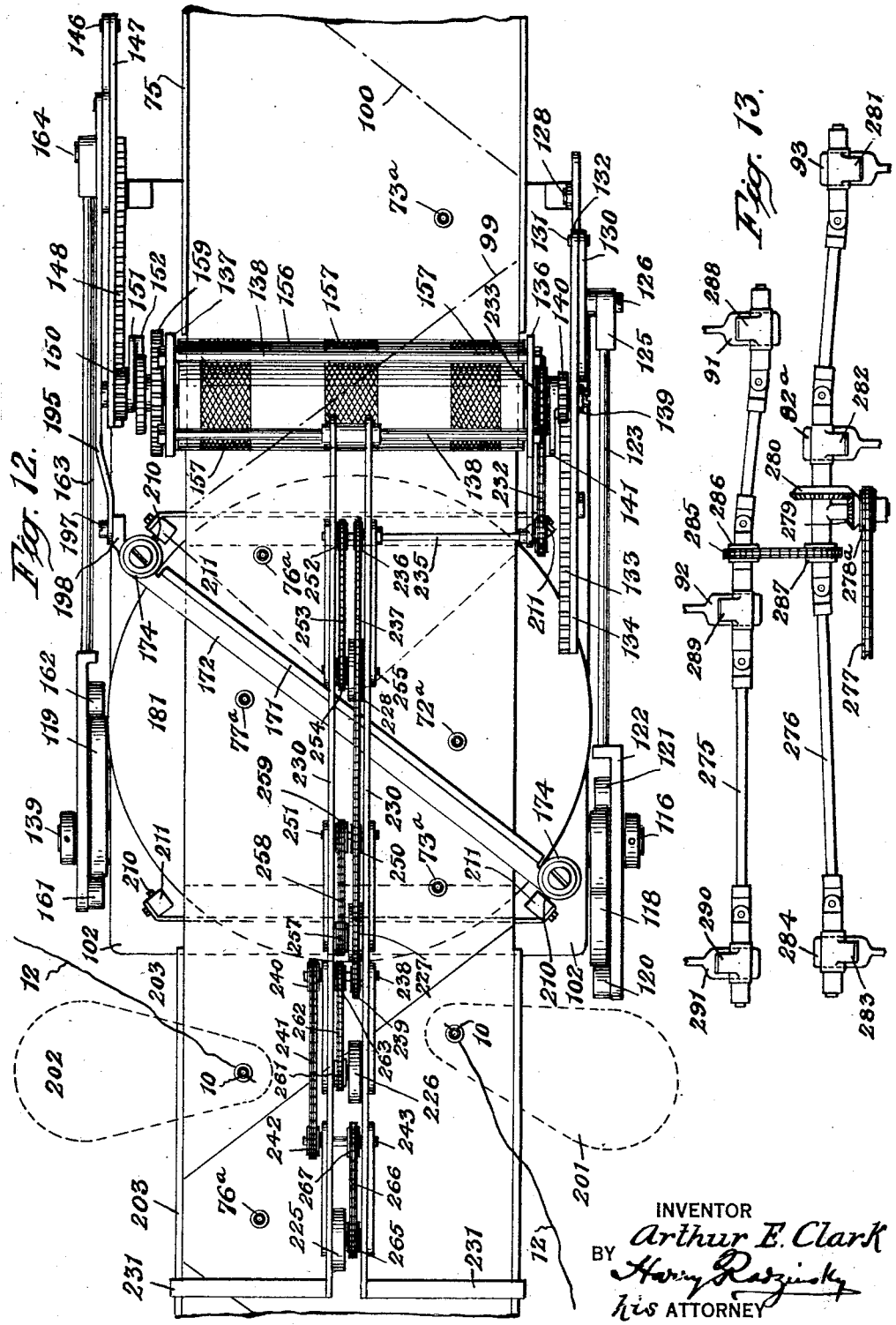

Oct. 13, 1931.　　　　A. E. CLARK　　　　1,826,925

MACHINE FOR MAKING DIAPERS

Filed Feb. 26, 1929　　7 Sheets-Sheet 6

INVENTOR
Arthur E. Clark
BY Harry Radzinsky
his ATTORNEY

Oct. 13, 1931.    A. E. CLARK    1,826,925
MACHINE FOR MAKING DIAPERS
Filed Feb. 26, 1929    7 Sheets-Sheet 7
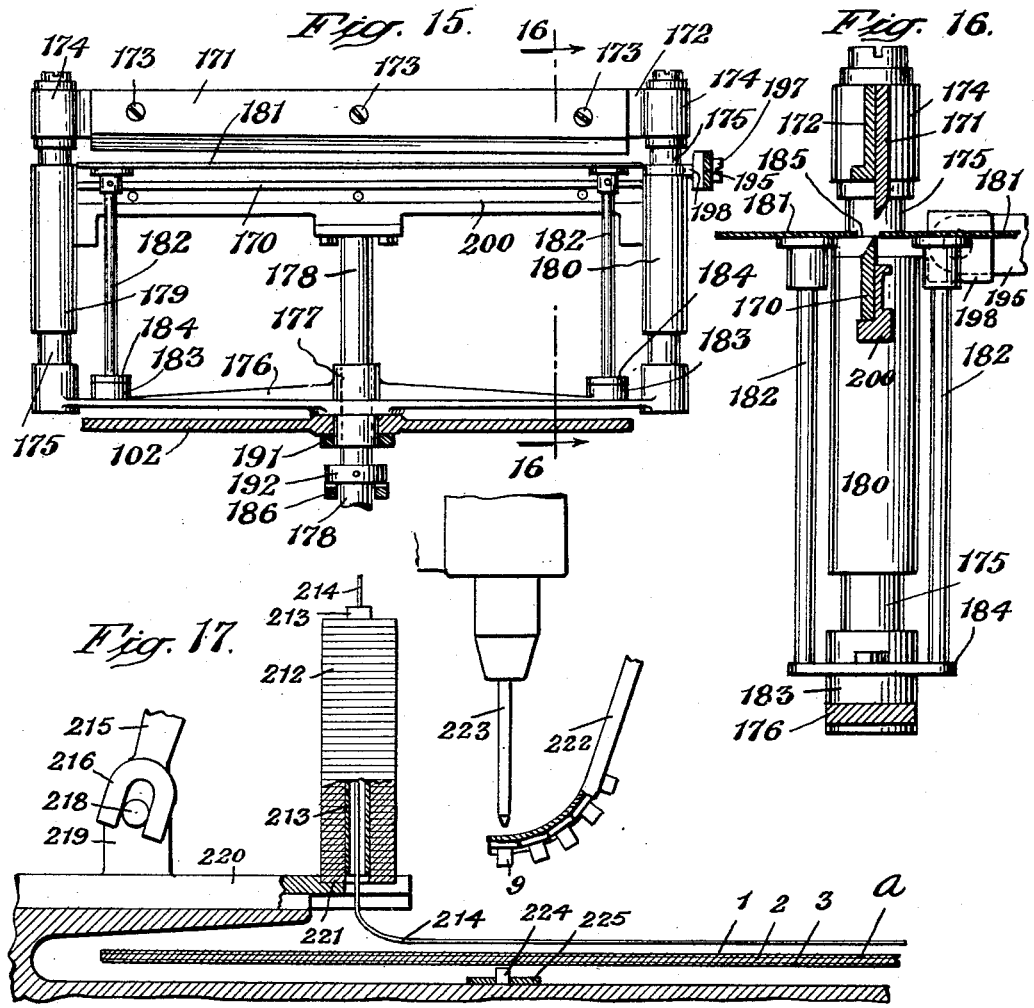
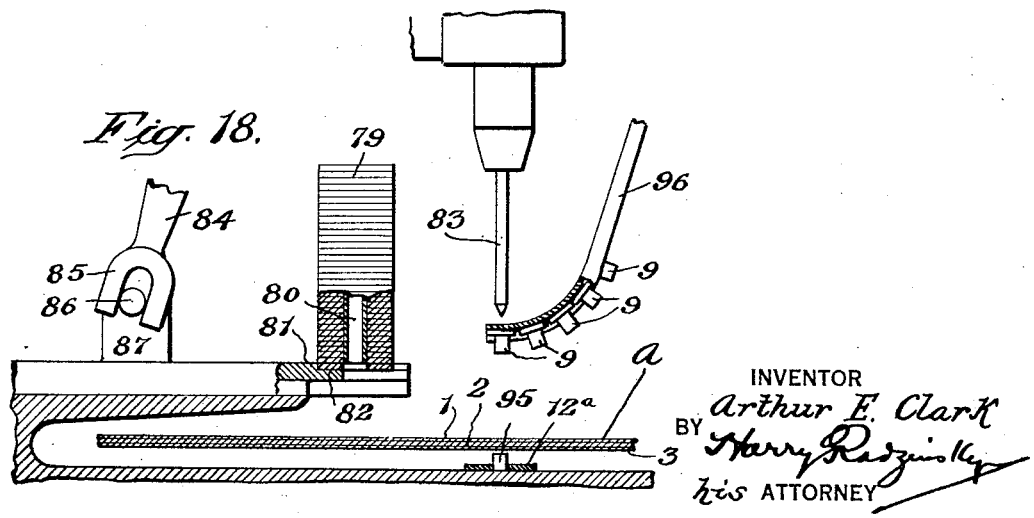
INVENTOR
Arthur E. Clark
BY Harry Radzinsky
his ATTORNEY Patented Oct. 13, 1931

1,826,925

UNITED STATES PATENT OFFICE

ARTHUR E. CLARK, OF FREEPORT, NEW YORK, ASSIGNOR TO THE DIAPEX CORPORATION, OF NEW YORK, N. Y., A CORPORATION OF NEW YORK

MACHINE FOR MAKING DIAPERS

Application filed February 26, 1929. Serial No. 342,720.

This invention relates to a machine for making infant's protective diapers, and particularly the kind disclosed in the patent of Charles M. Schwartz, No. 1,723,303, Aug. 6, 1929. The type of diaper therein disclosed consists generally of a triangulated sheet composed of an outer layer of water-repellant paper, an inner or central layer of absorbent paper or cellulose and an inside lining layer of thin open-mesh textile fabric. The manner in which the multiple layers of material constituting the diaper are arranged may be varied in different ways to suit different requirements.

This invention relates to a machine for making such or similar garments, and has for its object therefore, the provision of such machine which shall be of simple construction; which shall be speedy and effective in operation and accurate in result, enabling large quantities of these diapers to be turned out at a minimum of cost. Since the type of diaper intended to be made by this machine is one not intended to be washed but one which shall be used but once and then discarded, it is obvious that speed and economy in producing these articles is a definite requirement. I attain this and other objects through the construction hereinafter described and more particularly pointed out in the claims appended hereto.

Reference is to be had to the accompanying drawings, forming a part hereof, in which Figure 1 is a plan view of the outer face of one of the diapers made by my machine, with parts of the several layers constituting the same being broken away to disclose construction;

Figure 2 is a sectional view of the line 2—2 of Figure 1, looking in the direction of the arrows;

Figure 3 is a diagrammatic plan view showing the sequence of operation of the various parts of the machine;

Figure 4 is a side elevation of the structure disclosed in Figure 3;

Figure 5 is a diagrammatic view showing the manner of operation of the strip or sheet-assembling means;

Figure 6 is a sectional view of the sheet-assembling mechanism;

Figure 7 is a sectional view on the line 7—7 of Figure 6, looking in the direction of the arrows;

Figure 8 is a sectional view on the line 8—8 of Figure 6, looking in the direction of the arrows;

Figure 9 is a front elevation of the rollers and attendant mechanism used for feeding the triple-layer strip to the cutting knife, where said sheet is cut into the diapers;

Figure 10 is a side elevation of the mechanism disclosed in Figure 9;

Figure 11 is a plan view beneath the top plate of the frame which supports the mechanism for operating the cutting knives;

Figure 12 is a plan view of the cutting mechanism, indicating the points at which the stringed eyelets are applied, and also disclosing the means for feeding the uncut sheet to the cutting mechanism, and also showing the means for feeding the cut diapers to the string-applying presses;

Figure 13 is a view showing the flexible shafts and cam means thereon for operating the presses which apply the buttons and strings to the diapers;

Figure 15 is a sectional view showing the cutting means or knife;

Figure 16 is a sectional view on the line 16—16 of Figure 15, looking in the direction of the arrows;

Figure 17 is a diagrammatic view showing the operation of one of the presses which apply a washer or disk and a string to the diapers; and Figure 18 is a similar view of one of the presses which applies a disk or button about which the string may be wound to hold the diaper about the body of an infant.

Throughout the various views of the drawings, similar reference characters designate similar parts.

Figure 14:
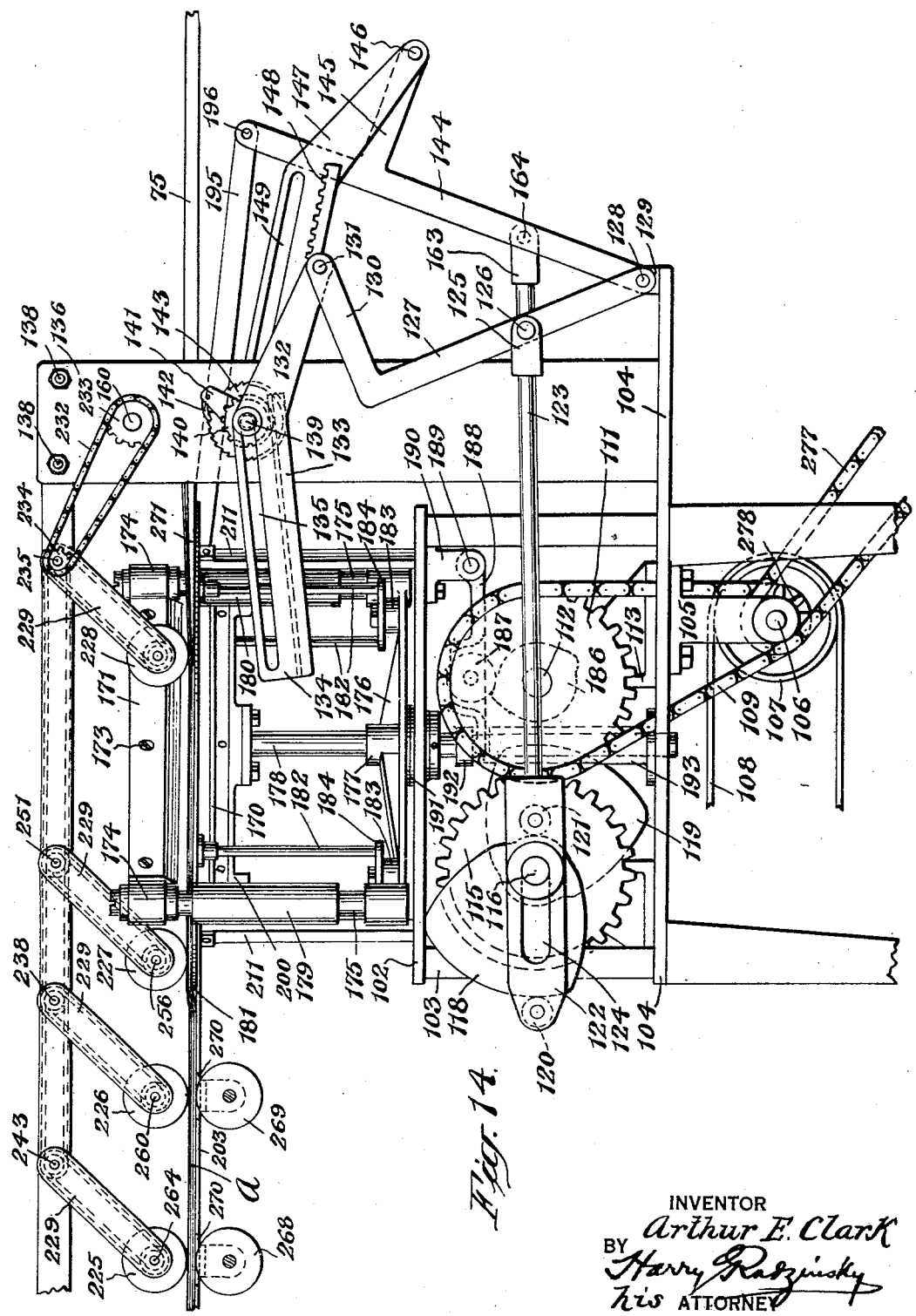
Figure 14 is a side elevation of the structure shown in Figure 12.

A reference to Figures 1 and 2 of the drawings will disclose the type of garment made by my improved machine. The same is composed of an outer layer or sheet 1 which is made of any suitable water-impervious paper that will be at least water-repellant and if possible, wholly water-proof. Suffice it to say that the same is a thin and flexible paper having the characteristic just described. This layer or sheet 1 is outermost when the garment is worn. At 2 is shown a central layer or padding which may be made of a multitude of thin sheets of soft, absorbent material, such as paper or cellulose. At 3 is shown the innermost layer or lining and the same preferably consists of a very thin open-mesh textile fabric.

The three layers just mentioned may be held together during the process of making the garment in any suitable way, such as by lines or dabs of glue applied between them; or else, such layers may be merely held together by the pressure of rollers or the like until the same are united by the eyeletted disks which subsequently serve, when connected by a string secured on the garment, to hold said garment about the body of the infant by whom it is worn. I have herein described these garments and the strip or sheet from which they are made as being "multi-layered". By this term it will be understood that I mean a strip or sheet composed of at least two layers, i. e., an outer water-proof sheet and an inner absorbent padding.

As is clearly disclosed in Figure 1, there are three disks applied to each garment, one of each of said disks being preferably located near each of the terminals 4, 5 and 6 of the garment. Two of the disks are shown at 7 and 8, these two disks being applied to a strip before the same is cut into garments. These disks are held in place by eyelets 9 which pass through them and by the action of a suitable press are clenched over on an inner reinforce 12a located on the inside face of the garment. The third disk 10 is held in position by an eyelet 11 which eyelet also acts to secure beneath the disk, a tying cord or string 12. Thus, when the garment is fitted about the child, the cord 12 is wound underneath the three disks 7, 8 and 10 in such manner as to securely hold the garment in position, at the same time acting to draw the diaper securely about and properly fit it to the child on whom it is applied.

Referring now to Figures 5 to 8 inclusive. Here is shown the mechanism which produces the multi-layer sheet from which the diapers are cut. A supporting frame is here shown, the same having a pair of elongated lower side members 13 which support a freely rotatable and manually removable shaft or spindle 14. This shaft 14 acts to support a roll 15 of the absorbent paper or cellulose 2 which in the finished garment comprises the central layer. As this material is of fairly substantial thickness, a rather large roll is accommodated on the shaft 14. The roll being thus large and the material extremely soft, a tendency of the roll to twist and wobble on the shaft 14 is sometimes exhibited. I find that this may be curbed by the use of a plurality of aligning rollers 16 which are located at opposite sides of the roll. There are a number of these rollers in each set, the same being mounted on stud shafts 17 supported on a member 18 on the frame. Thus, since the roll 15 is firmly held between the two sets of rollers 16, its tendency to twist or wobble on its shaft 14 is greatly minimized.

The absorbent material removed from the roll 15 extends upwardly and passes with the outer paper layer 1 over an idle roller 19 which is mounted on a shaft 20 rotatably supported by the frame of the machine in any well-known desired way. From thence the absorbent material 2 in company with the other layers which form the final sheet, passes between a pair of rollers 21 and 22 so that when the same passes out through the two rollers 21 and 22 it is located between and, if preferred, adhesively united with the two other layers.

At 24 is shown a roll of the thin, water-repellant paper 1, which in the finished garment forms the outermost layer or covering. This roll is supported on a freely rotatable shaft 25 which may be supported in suitable bearings located on the longitudinal members 13 of the frame. The paper taken from the roll 24 passes under an idle roller 26 that is fixed on a shaft 27 that freely rotates in brackets 28. At 29 is one of several gumming disks. Several of these disks are secured in spaced relationship on a shaft 30 that extends across a glue-trough 31 which contains glue or gum 32 into which the disks 29 dip. The disks 29, bearing against the paper 1 as it passes about the roller 26, act to apply spaced lines of glue to the paper causing said paper to adhere to one surface of the cellulose layer 2.

The shaft 30, upon which the disks 29 are secured, is driven by a chain 33 which engages with a sprocket 34 fixed on the end of the shaft 30. This chain 33 passes over a sprocket 35 that is fixed on a shaft 36 upon which the roller 21 is secured. Said shaft 36 is in turn driven by a belt 37 extending from any suitable source of power, and this belt passes around a pulley 38 secured on, or connected by clutch mechanism, to the shaft 36.

At 39 is shown a gear that is secured on the shaft 36 and the same engages with and drives a gear 40 that is fixed on a shaft 41 on which the roller 22 is secured. It will thus be seen that the two rollers 21 and 22 are rotated through the mechanism just described and that they act to press between them the three layers of material which form the sheet that is subsequently cut up into the diapers. The manner in which two of the layers of such material, consisting of the cellulose layer 2, and the outer paper covering layer 1 are fed between the rollers 21 and 22, has been described. The third or inner lining layer 3, consisting of a thin open-mesh fabric, is contained on a roll 42 held on a shaft 43 that is freely rotatable in suitable bearings fixed on upright members 44 of the frame. The fabric drawn from the roll 42 passes under an idler 45 that is rotatably held between arms 46 on the frame. A plurality of gumming disks 47 secured on a shaft 48 dip in gum 49 contained in a gum-trough 50. These disks 47 apply spaced lines of gum to one face of the fabric 3. The disks are driven by a drive chain 51, which engages with a sprocket 52 secured on the shaft 48 on which the gumming disks 47 are mounted. This chain extends from a sprocket 53 secured on the end of the shaft 41 that is in turn driven in the manner heretofore explained.

From the description just given and diagrammatically illustrated in Figure 5, it is apparent that the materials from the three rolls 15, 24 and 42 pass together between the two pressing rolls 21 and 22. Since gum is applied to one of the surfaces of the paper 1 by the disks 29 it is apparent that said paper will be caused to adhere to one surface of the cellulose material 2 when the materials 2 and 1 are pressed together between the rollers 21 and 22. It is also apparent that since gum is applied to the under surface of the inner fabric layer 3 by the disks 47, such fabric layer will be caused to adhere to the opposite face of the cellulose material by the pressing operation of the rollers 21 and 22. Thus, when the multiple layer sheet or strip A produced as was just explained, moves out from between the rollers 21 and 22 and progresses in the direction of the arrows in Figure 3, the several layers of the material are firmly adhered together and the resultant multi-layer material is then wound upon a spindle 54 to form a roll 55, as disclosed in Figure 6. To effect this operation of winding the finished multiple layer strip material into the roll 55, I provide a winding roller 56 that is mounted to rotate between uprights 57 and 58 and is capable of an elevating movement therebetween so that it rests at all times on top of the roll 55 regardless of the size of the roll. The roller 56 is driven by a chain 59 which engages with a sprocket 60 fixed on the shaft 61 on which the roller 56 is secured. This chain 59 is driven from a sprocket 62 that is secured on the shaft 36, such shaft 36 being driven, as was heretofore explained by the belt 37 extending from a motor or any other suitable source of power.

In order to effect a ready removal of the roll 55, when sufficient material is wound thereon, the roller 56 may be manually elevated and held in a raised position by means of catch members 63 mounted on opposite sides of the frame on the upright member 57.

From the foregoing, it will be seen that through the instrumentalities described, the sheet material composed of multiple layers is produced in the form of the roll 55. It may then, if desired, be fed directly from said roll to the fastener applying mechanism now to be described, or if preferred, the roll 55 may be removed from its position shown in Figure 6 and supported adjacent to the fastener-applying mechanism which can be located distant from the strip-forming mechanism. Thus, in cases where floor space is limited, the mechanism for forming the multiple-layer strip may be located distant from the remainder of the mechanisms which produce the diaper.

I have heretofore stated that it is desirable to gum together the various layers which constitute the sheet or strip from which the diapers are formed. Since, in some instances, objection to the use of gum or glue in diapers might possibly be raised, I would state that if desired, the gumming may be dispensed with and the three layers 1, 2 and 3 may be merely fed together from between the rollers 21 and 22 and caused to pass between an additional pair of feeding rollers 70 and 71, driven by suitable mechanism, to cause the multiple layer fabric to progress toward disk-applying presses. The strip A, composed of the layers 1, 2 and 3 is fed between the rollers 70 and 71 with the outer paper layer 1 uppermost and said strip is of such width that it corresponds to the diaper length, thus permitting diapers to be cut from such strip without waste of material.

As the strip leaves the rollers 70 and 71 it passes along on the top of an elongated table or support 75 until it reaches four spaced paper disk-applying presses 72, 73, 76 and 77. Two of these presses are placed on each side of the table at the positions indicated. These presses are commercially sold in the open market and are thus procurable in various forms, and since the particular mechanism of these presses forms no part of the invention, it will not be described in great detail. Suffice it to state, that in most of these presses (of the kind used at 72, 73, 76 and 77) on the market, a plurality of perforated paper disks or washers (see Figure 18) are held in a stacked pile as at 79 upon a hollow rod 80. A slide 81 is movable beneath the stack 79, this slide having a seat 82 at its end, and said seat receives the lowermost washer or disk from the stack and moves the same to a position beneath a punch 83. The slide 81 is usually reciprocated by means of a crank 84 having a yoke 85 on one of its ends that engages with a stud 86 that is located on an ear 87 formed on the slide. The crank 84 is operated by suitable mechanism (not shown) said mechanism being initially operated by a foot pedal in the base of the press. Portions of these foot pedals are shown at 91, 92, 92a and 93 in Figure 13. Presses of the kind under consideration usually have an anvil stud 95 about which a lower washer or inner reinforce 12a (see Figure 2) is fed by suitable feeding means. An eyelet chute is indicated at 97, and the eyelets 9 descend therein by gravity, the lowermost eyelet in the chute assuming a position directly beneath the punch 83 and directly over the anvil stud 95. It will be clear from the foregoing that a downward stroke of the punch 83 will force an eyelet downward and through a washer or disk held below the punch by the seat 82 of the slide 81. The washer or disk thus carried downward will rest on top of the multiple layer sheet held beneath it and the eyelet will pass through the sheet and clench behind the paper washer or disk 12a which is shown surrounding the anvil stud 95 in Figure 18. As was heretofore stated, the description of the paper disk-applying device just given is that of a press in common use, and it will be obvious that any of the well known types of paper washer or disk-applying presses may be as well used as a part of my combination.

An inspection of Figure 3 shows that there are four of the disk-applying presses used, the same being indicated at 72, 73, 76 and 77. The paper washers or disks applied by each particular press are indicated by similar numerals; that is, the press indicated at 72 applies to the sheet those washers or disks indicated at 72a; the press 73 applying the washers shown at 73a; the press 76 applying the washers shown at 76a and the press 77 applying the washers shown at 77a.

The dotted lines indicated at 99 and 100 in Figure 3 show the positions where the cutting mechanism to be described, severs the strip along transverse diagonal lines to produce the diapers. It will be seen from Figure 3 that when the strip or sheet leaves the four presses 72, 73, 76 and 77 the washers that have been applied by said presses are so located that when the strip is transversely severed on the lines 99 and 100, two washers (those indicated at 7 and 8 in Figure 1) have been applied to each diaper.

The knife for cutting the multi-layer strip transversely on diagonal lines to form the same into diapers, is indicated diagrammatically at 101 in Figure 3. The details thereof, as well as of the feeding mechanism which feeds the unsevered strip to said knife, is disclosed in Figures 9, 10, 11, 12, 14, 15 and 16. Here is shown a frame or table having a top 102, legs 103 and an intermediate flat support 104. A bracket 105 is secured to the support 104 and this bracket rotatably supports a shaft 106 on which a pulley 107 is secured. A belt 108 passes over the pulley, said belt being driven from a motor or any other suitable power source. The shaft 106 also carries a sprocket over which a chain 109 extends and said chain passes upward through a slot 110 (see Figure 11) in the flat support 104, and extends over a sprocket 111 fixed on the end of a shaft 112 that is mounted to rotate in bearings 113 secured to the upper face of the supporting plate 104.

The shaft 112 carries, in addition to the sprocket 111 just mentioned, a gear 114 which meshes with and drives a gear 115 that is fixed on a shaft 116 mounted in bearings 117 secured to the upper face of the flat support 104. Secured on one end of the shaft 116 is a cam 118 and a similar cam 119 is secured on the opposite end of the shaft, said cams being oppositely disposed; that is, with their high portions extending in opposite directions. The cam 118 operates on a pair of spaced rollers 120 and 121 which are rotatably mounted on studs formed on the flat end 122 of a connecting rod 123. The end 122 of the connecting rod is in the form of a yoke and thus has an elongated slot 124 through which the shaft 116 passes. The rod 123 is thus free to reciprocate on the shaft 116 under the impulse of the cam 118 acting on the rollers 120 and 121. Thus, when the high portion of the cam bears against the roller 120 the rod is drawn to the left of Figure 14 and reversely, when the high portion of the cam acts on the roller 121, the rod 123 is forced in a direction to the right of Figure 14. Through the motion just described that is applied to the rod 123, the strip feeding mechanism which feeds the strip to the cutting knife, is operated.

The end of the rod 123 located opposite to that shown at 122, is provided with a clevis 125 which is pivotally connected by a pin 126 to a lever 127. This lever 127 has its lower end pivoted at 128 to a bracket or ear 129 extending upwardly from the flat support 104 of the frame. The lever 127 has an off-set upper end 130 that is pivoted at 131 to an arm 132 formed on a toothed rack 133. This rack 133 has a vertical flange 134 that is provided with an elongated slot 135.

At 136 and 137 is shown a pair of spaced uprights which are secured to and extend vertically from the flat support 104 of the frame. These uprights are held in spaced apart relationship at the top by braces 138, and said uprights act to support a rotatable shaft 139, one end of which projects through the slot 135 in the rack 134, permitting said rack to have a reciprocating movement on said shaft 139 under the impulse of the cam 118 acting through the connecting rod 123 and lever 127.

Freely mounted on the shaft 139, is a pinion 140 and secured to said pinion is an arm 141 which carries a spring-pressed pawl 142. Said pawl engages with a ratchet 143 that is fixed on the shaft 139 so that when the pinion 140 is rotated by means of the rack 133, the ratchet 143, and consequently the shaft 139 on which it is fixed, will be rotated.

On the opposite end of the shaft 139 to that at which the ratchet 143 is located, is a mechanism similar to that just described. On said end of the shaft 139 is located a pivoted lever 144, similar to the lever 127 previously described. Said lever 144 is provided with an off-set or lateral extension 145 which is pivoted at 146 to an arm 147 formed on a rack 148. This rack 148 is provided with an elongated slot 149 permitting it to freely move back and forth on the end of the shaft 139 to rotate a pinion 150 which meshes with said rack 148. This pinion is free on the shaft 139 and carries an arm 151 which in turn carries a spring-pressed pawl 152 that engages with a ratchet 153 secured on the shaft 139.

The shaft 139 carries a roller 154 which is provided with spaced roughened surfaces 155 to firmly grip and feed the multi-layer strip. This roller co-operates with a similar upper roller 156, which is also provided with spaced roughened surfaces 157, to feed the strip forward toward suitable cutting means which severs the strip transversely into the diapers. The roller 154 being intermittently rotated through the ratchet mechanism heretofore described, acts to rotate the upper roller 156 through a gear 158 that is fixed on the shaft 136 and meshes with a similar gear 159 secured on the shaft 160 on which the roller 156 is mounted.

From the foregoing the manner in which the strip or sheet is fed to the knife which is diagrammatically indicated at 101 in Figure 3, will be readily understood. The cam-shaft 116, being driven by the gears 114 and 115, causes, through the medium of the cam 118 and rollers 120 and 121, the connecting rod to reciprocate. Under the impulse of the rod 132, the lever 127 is forced to the right of Figure 14, drawing the rack 33 in the same direction and thus rotating the pinion 140. Said pinion, through the medium of the pawl 142 and ratchet 143 causes the roller 154 to rotate, the same rotating the roller 156 in an opposite direction through the gears 158 and 159 to feed the strip A forward. When the rack 133 reaches the end of its stroke there is a momentary pause in the feeding operation while the knife makes one of the diagonal transverse cuts indicated by the lines 99 in Figure 3. Thereupon the cam 119, operating on rollers 161 and 162 mounted on a connecting rod 163 (similar in construction to the rod 123) causes said rod to be thrust toward the right of Figure 14 so that it swings in the same direction, the lever 144 to which it is pivotally connected as at 164. This movement causes the rack 148 to rotate the pinion 150, and through the medium of the pawl 152 and ratchet 153, the roller 154 also. When the ratchet 148 reaches the end of its stroke, the knife has been moved to the position shown in Figure 12 and said knife produces one of the cuts indicated at 100 in Figure 3 of the drawings.

The knife just referred to is disclosed in detail in Figures 15 and 16, and the same consists of a movable lower cutting blade 170 and a fixed upper blade 171. The upper blade 171 is secured to a cross member 172 by screws 173 and may, if desired, be regulatable with respect to the movable lower blade 170 to obtain the greatest cutting efficiency. The cross member 172 is provided at its opposite ends with bosses 174 which fit and are secured on the upper ends of supporting posts 175. These supporting posts have their lower ends connected by a cross bracket 176 that is provided with a central boss 177 through which a stem 178 carrying the lower blade 170, vertically reciprocates.

The movable lower blade 170 is carried by a cross-head 200 that is secured on the upper end of the stem 178 and is therefore vertically reciprocated with said stem. This head 200 has its ends terminating in sleeves 179 and 180 which freely slide up and down on the posts 175 when the lower blade 170 is raised and lowered to co-operate with the upper blade 171 in cutting the multi-layer sheet A. At 181 is disclosed a circular sheet-supporting table which is supported by uprights 182, the lower ends of which are held on plates 184 which are secured to bosses 183 formed on the cross bracket 176. This table 181 oscillates with the knife-supporting frame in a manner to be explained. To permit the knife blades 170 and 171 to come together and co-operate to perform the cutting operation, said table is slotted as at 185 through which the movable blade 170 may be elevated. This elevating movement of the lower blade 170 is performed by a cam 186 fixed on the shaft 112. Said cam operates upon a roller 187 rotatably held on a lifter 188 that has one of its ends pivoted at 189 in a bracket 190 secured to the under face of the table member 102. The stem 178, which carries the movable blade 170 at its upper end, extends downwardly through a bearing 191 in the table member 102 and below the table 102 said stem is provided with a collar 192 on which the yoked end of the lifter 188 may operate to raise the stem. The lower end of the stem slides in a boss 193 secured on and extending upward from the upper face of the flat member 104.

It is clear from the foregoing that through the cam 186 the stem 178 is caused to be periodically elevated, thus moving the blade 170 upward through the slot 185 in the table 181 to sever the tri-layer sheet or strip that is fed across said table by the rollers 155 and 156. This cutting action occurs when the knife is in two positions, one of which is disclosed in Figure 12, which produces the cut indicated at 100 in Figures 3 and 12. The other cut, indicated at 99, is made by swinging the knife about its axis 178 until it assumes a position across and at an angle to that shown in Figure 12.

The knife is thus oscillated by means of a link 195 which has one of its ends pivotally connected as at 196 to the upper end of the lever 144. The opposite end of the link 195 is pivotally connected at 197 to an ear 198 secured to one of the knife frame posts 175. Thus, when the lever 144 is reciprocated under the impulse of the cam 119 as was previously explained, the knife frame is swung to either of the two positions required to make the cuts indicated at 99 and 100. When it reaches either of these two positions, the lower blade 170 is elevated under the impulse of the cam 186, and said blade co-operates with the fixed upper blade 171 to cut through the multi-layer strip A.

To properly halt movements of the knife frame at the desired positions where the cuts are to be made, I provide stops 210. These stops may be in the form of rubber blocks, or the same may be spring mounted. They are fixed upon posts 211 extending upright from the table member 102.

The result of the knife operation just described is to cut up or sever the strip A into a number of triangulated diaper-shaped sections which are of the proper conventional shape. Each of these sections, as they leave the knife, are provided with two disks, the two on one diaper being those indicated at 73a and 77a, and those on the oppositely disposed diaper being indicated at 72a and 76a (see Figures 3 and 12). Therefore, to complete each diaper it is necessary to apply another paper disk and tying string. The presses for applying these disks and strings are indicated at 201 and 202, one of each is located on each side of a table or support 203. These presses are made and sold commercially, therefore no detailed description of the same is necessary. The commercial type of press used for applying paper washers and strings usually has (see Figure 17) a stack of washers 212 supported on a tubular rod 213 through which the string 214 is fed. A crank member 215 has its lower end provided with a yoke 216 which engage with a stud 218 formed on the ear 219 that projects from a slide 220. This slide is movable beneath the washer stack 212 and it is provided with a seat 221 which receives the lowermost washer in the stack. Under the impulse of the crank arm 215 the washer held on the seat 221 is moved forward beneath the lowermost eyelet 9 held in an eyelet chute 222. The eyelet just mentioned is positioned directly below a punch member 223, which upon being thrust downwardly, passes through the disk fed by the slide and with the co-operation of an anvil stud 224 secures the disk, the cord 214 and a lower reinforcing disk 225 to the sheet A. A suitable severing mechanism (not shown) cuts off the string close to the applied disk.

By the use of two presses of the character just described there is applied to each diaper as the same is fed to said presses 201 and 202, a disk 10 and a string 12 (see Figures 3 and 12). To properly feed the cut diapers to these presses 201 and 202, I provide a feeding mechanism consisting of a plurality of feed rollers 225, 226, 227 and 228. Each of these rollers is mounted between the lower ends of a pair of links 229, the several pairs of links being suspended from an elongated frame composed of a pair of side members 230. This frame is supported at one of its ends by the cross brace 138 and at its opposite end by upward extensions 231 from the table or support 203.

A chain 232, driven from a sprocket 233 that is fixed on the end of the shaft 160, connects to a sprocket 234 fixed on the end of an axle 235. Said axle 235 carries a sprocket 236 over which a chain 237 passes. Said chain 237 drives a sprocket 250 fixed on an axle 251. Rotatably mounted between the frame members 230 is an axle 238 on which a sprocket 239 is secured. The chain 237 also engages with this sprocket 239. The shaft 238 carries another sprocket 240 which drives another axle 243 through the medium of a chain 241 that engages with a sprocket 242 on said axle. It will be seen therefore, that the chain 232, driven from the sprocket 233 on the shaft 160, rotates, through the chain drives described above, the axles 235, 251, 238 and 242. The shaft 235 carries a sprocket 252 from which a chain 253 extends, said chain passing around a sprocket 254 secured on the axle 255 on which the roller 228 is mounted.

The rollers 227, 226 and 225 are similarly driven. Roller 227 has an axle 256 which carries a sprocket 257 that receives a chain 258 extending from a sprocket 259 that is secured on the axle 251. The roller 226 has an axle 260 that carries a sprocket 261 which receives a chain 262 from a sprocket 263 secured on the axle 238. Roller 225 has an axle 264 on which a sprocket 265 is secured, said sprocket being driven by a chain 266 from a sprocket 267 fixed to the driven axle 243.

On the under side of the table or support 203, I provide idle rollers 268 and 269 which are located directly below the rollers 225 and 226, these idle rollers projecting through apertures 270 provided in the table, so that the cut diapers are gripped firmly between the pairs of rollers 225 and 268 and 226 and 269 and fed positively and without any shifting of their positions, to the string-applying presses 201 and 202.

As the table 181 is carried by the knife frame and is oscillated therewith, I prevent this table exerting a twisting strain upon the roller 228, by placing directly over the table and beneath the roller 228, a fixed flat support 271 beneath which the table is free to move.

In Figure 13 is disclosed the mechanism which operates the presses 72, 73, 76, 77, 201 and 202. This mechanism primarily consists of a pair of flexible shafts 275 and 276 disposed near the bottom of the machine frame. These shafts are driven by a chain 277 which extends from a sprocket 278 that is secured on the driven shaft 106. This chain connects to a sprocket 278a fixed on a bevel gear 279. This bevel gear 279 meshes with and drives another bevel gear 280 that is fixed on the shaft 276. Said shaft 276 operates the presses 72, 73 and 201 by means of cams 281, 282 and 283, these cams serving to depress at the proper time, the actuating pedals 92a and 93 provided on the presses 73 and 72, and also to depress a similar actuating pedal 284 customarily provided on the press 201.

The shaft 275 is driven from the shaft 276 by a chain 285 which extends about sprockets 286 and 287 secured on the respective shafts. Said shaft 275 is provided with three cams 288, 289 and 290, which at the proper time serve to depress the pedals 91 and 92 on the presses 76 and 77 and also depresses at the proper time a similar actuating pedal 291 provided on the string-applying press 202.

From the foregoing the operation of my improved diaper-making machine will be readily understood. Assuming first, that a strip of multi-layer paper has been produced by the mechanism shown in detail in Figures 6, 7 and 8, and the same is in rolled form as shown by the roll 55. The strip A thus produced, is then fed from the roll and passes along the table 75 by rollers 70 and 71, or by any other suitable feeding means, until it reaches the group of presses 72, 73, 76 and 77. The pedals 91, 92, 92a and 93 are then depressed by their respective cams 281, 282, 288 and 289 and apply four disks or buttons and repeat this operation continually on the strip. As the strip progresses further it passes between and is fed along by the rollers 154 and 156. It will be noted that the disks which have been applied to the strip pass through the smooth spaces located between the roughened parts 155 and 157 on these rollers and this unevenness in these rollers thus avoids the disks being damaged by the roller pressure. As the strip reaches the knife, it passes between the blades 170 and 171. The blade 170 is then elevated to make one of the cuts, say that indicated at 100, which is the position at which the knife is located in Figure 12. The lever 144 is then moved to the left of Figure 14 and through the medium of the link 195, it swings the knife to the opposite angle, at the same time operating the rollers 154 and 156 to move the strip along. Thus, when the knife operates to make the cut 99, the width of one diaper has been passed between the knife blades and the resultant cut 99 severs a diaper from the strip. This cutting operation continues until the roll 55 is exhausted.

The diapers as thus cut, are moved along by the rollers 225, 226, 227 and 228 and by the co-operating idlers 268 and 269 without being displaced from their positions, to the two presses 201 and 202 which at the proper time have their actuating pedals 284 and 291 depressed so that they apply a string and disk to each diaper fed to them. The completed diapers are then fed from these presses by the rollers 225 and 226 to a table or other support where they are removed for packing.

While I have shown one embodiment of my invention, it is obvious that the same is not to be restricted thereto, but is broad enough to cover all structures coming within the scope of the annexed claims.

What I claim is:—

1. In a machine of the class described, sheet-feeding means, cutting means for severing the sheet fed by said means into triangulated sections, and means for applying garment-fastening members to said triangulated sections.

2. In a machine of the class described, means for feeding a multi-layer paper sheet, means for severing garment-shaped sections from said sheet, and means for applying buttons and a tying member to each of said severed sections.

3. In a machine for making paper diapers, means for feeding a layered paper strip, means for cutting diaper-shaped sections from said strip, and means for applying garment-fastening members to said diaper-shaped sections.

4. In a machine for making protective paper diapers, means for feeding a paper strip, strip-severing means, button-applying means located intermediate of the sheet-feeding means and the severing means, and means for applying flexible tying members to severed sections of the strip.

5. In a machine of the class described, sheet-feeding means, means for severing the sheet fed by said means, into diaper-shaped sections, means for applying spaced garment-fastening members to said sheet prior to the severing of the same, and means for applying an additional fastening device to each of the severed sections.

6. In a machine of the class described, means for supplying a layered strip, cutting means for transversely severing said strip into diaper-shaped sections, and means for applying disks and a string to each of said diaper-shaped sections.

7. In a machine of the class described, means for supplying a layered paper strip, means for applying spaced paper disks on said strip, means for severing said strip into diaper-shaped sections, and means for thereafter attaching a string to each of said severed sections.

8. In a machine of the class described, means for severing a paper strip into triangulated sections by making cuts across the full width of said strip, means for applying paper disks adjacent to two of the terminals of each of said triangulated sections, and means for applying a string to each of said triangulated sections adjacent to the remaining terminal thereof.

9. In a machine of the class described, means for feeding a strip composed in part of paper, means for applying diaper fasteners together, a knife to which said strip is fed by said feeding means, said knife having an oscillating frame and fixed and movable blades, means for oscillating said frame, means for moving the movable blade to cause the same to co-operate with the fixed blade to sever the strip transversely and diagonally on lines at an angle to one another at pauses in the oscillating movement of the knife frame.

10. In a machine of the class described, means for producing a layered strip, such means comprising a series of supports for holding rolls of material forming the various layers of the strip, means for feeding the material from said rolls together to form the final layered strip, means for severing said strip into diaper-shaped sections, and means for applying diaper fastening means consisting of disks and a string to each of said diaper-shaped sections.

11. In a machine of the class described, a strip-support, means for feeding a strip composed at least in part of paper along on said support, paper disk-applying presses located on opposite sides of said support, means for operating said presses to cause the same to apply spaced paper disks on said strip, cutting means for severing the strip into diaper-shaped sections, said cutting means operating to so sever the strip that two disks appear on each severed section, and string-applying means for applying a string to each of the severed sections.

12. In a machine of the class described, strip-feeding means, means for applying fasteners to the strip, diaper-severing means comprising an oscillating blade-frame, fixed and movable cutting blades held therein, means for elevating the movable blade at periods of rest in the oscillating movement of the blade-frame, and means for feeding a diaper-forming strip between the cutting blades.

13. In a diaper-making machine, a table, spaced paper-disk applying means located on opposite sides of said table, cutting means for severing a strip after paper disks have been applied thereto by the disk-applying means, said cutting means comprising cutting blades between which the paper strip is fed, means for oscillating said blades to cause the same to cut the strip into diaper sections, means for elevating one of the blades to cause it to co-operate with another blade to cut the strip, presses for applying stringed disks to the cut diaper sections, means for operating said presses, and means for feeding the cut diaper sections to said string-applying presses.

14. In a diaper-making machine, a support, paper-disk applying means located at said support, means for actuating said disk-applying means to cause the same to apply spaced disks on a paper strip moved along on the support, cutting means for severing said strip into diaper-shaped sections, and means for actuating said cutting means to cause the same to apply cuts at an angle to one another across the width of the paper strip.

15. In a diaper-making machine, strip-feeding means, cutting means for severing the strip fed thereby into diaper-shaped sections, and means for oscillating said cutting means to cause the same to make one diagonal transverse cut across the strip, and thereafter make a diagonal transverse cut at an angle to the first cut and means for applying a fastener to each of the diaper-shaped sections after the same have been cut.

16. In a diaper-making machine, strip-feeding means, a movable knife for making diagonal transverse cuts across a strip fed by said feeding means to sever triangulated sections from said strip, and means for applying fastener members to the triangulated members thus cut.

17. In a diaper-making machine, the combination of means for supplying a paper strip, means for severing said strip into diaper-shaped sections, and means for applying spaced disks and a string to each of said sections to form the same into finished diapers.

Signed at the city, county and State of New York, this 25th day of February, 1929.

ARTHUR E. CLARK.